US009670995B2

(12) United States Patent
Ebert et al.

(10) Patent No.: US 9,670,995 B2
(45) Date of Patent: Jun. 6, 2017

(54) TENSIONING AND DAMPING ELEMENT FOR ENDLESS CHAIN DRIVE, ESPECIALLY FOR ROLLER CHAIN DRIVES

(71) Applicant: EBERT Kettenspanntechnik GmbH, Schkeuditz (DE)

(72) Inventors: Siegfried Ebert, Schkeuditz (DE); Frank Ebert, Schkeuditz (DE); Hartmut Meier, Schkeuditz (DE); Horst Tanzmann, Schkeuditz (DE)

(73) Assignee: EBERT Kettenspanntechnik GmbH, Schkeuditz (DE)

( * ) Notice: Subject to any disclaimer, the term of this patent is extended or adjusted under 35 U.S.C. 154(b) by 154 days.

(21) Appl. No.: 14/627,451

(22) Filed: Feb. 20, 2015

(65) Prior Publication Data
US 2016/0245374 A1 Aug. 25, 2016

(51) Int. Cl.
*F16H 7/08* (2006.01)
*F16H 7/18* (2006.01)
*F16H 7/06* (2006.01)

(52) U.S. Cl.
CPC ... *F16H 7/0838* (2013.01); *F16H 2007/0819* (2013.01)

(58) Field of Classification Search
CPC . F16H 7/06; F16H 7/0829; F16H 7/18; F16H 2007/185; F16H 2007/0819; F16H 55/30; F16H 2055/306; F16H 55/14; F16H 7/1209; B62M 9/16
See application file for complete search history.

(56) References Cited

U.S. PATENT DOCUMENTS

| 4,328,879 | A * | 5/1982 | Tone | B62M 9/00 180/219 |
| 6,488,602 | B1 * | 12/2002 | Ebert | B62M 9/16 474/101 |
| 6,966,432 | B2 * | 11/2005 | Koban | B65G 23/06 198/833 |
| 2007/0093329 | A1 * | 4/2007 | Greppi | F16F 15/124 474/152 |

FOREIGN PATENT DOCUMENTS

| DE | 20006278 U1 | 1/2001 |
| DE | 10237277 A1 | 4/2004 |
| EP | 0625653 B1 | 5/1994 |
| EP | 1056964 B1 | 5/2003 |

* cited by examiner

*Primary Examiner* — William E Dondero
*Assistant Examiner* — Robert T Reese
(74) *Attorney, Agent, or Firm* — Muramatsu & Associates (57) ABSTRACT

A tensioning and damping element for endless chain drives, especially for roller chain drives, can be used for endless chain drives, which are to be tensioned diametrically. The material is an elastic plastic. All told, the known tensioning and damping elements, in conjunction with the wear of the chain, the load changing phases, as well as the reversing according to the degree of deformation, have the disadvantage of a phased running irregularity, an increased running noise and of wear-intensive areas in the toothed rim. An element with a ring part and a toothed rim of arc-shaped teeth with, in each case, axially opposite bulges in the roller-seating and, between these, roller-seating depressions, grooves, which are disposed peripherally between the ring part and the bulges, an extended pitch and extended roller-seatings with the advantageous profile shape similar to a semielliptical curve lying on the root circle.

3 Claims, 7 Drawing Sheets

TENSIONING AND DAMPING ELEMENT FOR ENDLESS CHAIN DRIVE, ESPECIALLY FOR ROLLER CHAIN DRIVES

TECHNICAL FIELD

The invention relates to a tensioning and damping element for endless chain drives, especially for roller chain drives. It can be used in mechanical engineering for endless chain drives, which are to be tensioned diametrically. The material is an elastic plastic.

BACKGROUND OF THE INVENTION

Such tensioning and damping elements are elastic elements, which can be deformed between the shape of a concentric ring and the shape of a Cassinian curve with a shape close to an ellipse with an external toothed rim, capable of gripping the chain, and are disposed between the tight side and the slack side of the chain. As a result of the elliptical configuration of the Cassinian curve, geometric concepts, customary for an ellipse, are used in the further text.

The tensioning function results from the fact that chain elongations are equalized in that the tensioning and damping element, pre-tensioned in an elliptical shape, strives for a stressfree concentric shape between the tight and slack sides of the chain.

From the EP 0 625 653 B1, a tensioning and damping element is known, which is disposed between the tight side and the slack side of the chain and which, as an elastically deformable element, has a toothed rim with teeth, which are elastically deformable about the stress-free starting position, laterally open, arc shaped and, with the ring profiles in the root circle, pass into one another.

Furthermore, the EP 1 056 964 B1 and the U.S. Pat. No. 6,488,602 B1 disclose a tensioning and damping element, for which especially the ring part, as the elastic bending increases, shows a decreasing resistance to bending, which is cross section-dependent. The tensioning and damping elements correspond in shape to that of the chain, which they are capable of gripping.

The toothed rim thereof consists of elastic teeth, which are laterally open, have the shape of an arc and the roller-seatings of which pass into one another with the ring profile in the root circle. For the purpose of guidance clearance, the widths of the roller-seatings are less than the internal width of the associated chain.

In the operating state, there are different factors, which relate to the shape correspondence between the chain to the tensioning and damping element, so that, during the rotation of the tensioning and damping element, there is a periodically deformed, indifferent tooth profile with periodically deformed, indifferent pitch over the whole of the external extent.

Since toothed rim lies outside of the neutral bending line of the ring part, the pitch of the latter is compressed for the elliptical shape and smaller than for the concentric shape of the ring part.

For the end positions of the stress-free concentric shape and the pre-stressed elliptical shape of tensioning and damping element, there is, accordingly, no agreement between the pitch of the concentric shape, corresponding at the same time to the finished state, and the pitch of the toothed rim, with the pre-stressed elliptical shape, with the disadvantage of the compression of the toothed rim in the region of contact with the chain.

Since the pitch of the chain, which is not worn out at the beginning of the operating period, is smaller than the pitch of the chain, which is worn out at the end of the operating period, there are constantly varying pitch deviations during the operating time.

However, the regions of the chain engagement with the external teeth and roller-seatings are particularly important for the precise functioning of the tensioning and damping element, especially for the shape correspondence between the toothed rim and the chain.

The greater the sum of the tight side and the slack side of the chain in contact with the roller-seatings, the more stable is the position and the precision of the runout and the effectiveness of the tensioning and damping element.

With respect to the chain inlet and the chain engagement, all contacted roller-seatings, since they lie outside of the neutral bending fiber of the ring part, are connected in the case of an elliptical deformation of the tensioning and damping element in the regions in question with a type of closing movement of the roller-seatings and, accordingly also, with a temporary reduction in size of the pitch.

In the area of the chain engagement about the secondary vortexes of the elliptical shape, there is, especially when there is maximum deformation as at the start of the operating time with a new chain and, with that, a chain, which has not been elongated, compression of the roller-seating areas near the ground, with the result of an elastic camber of the roller-seating base of the ring part in the center of the roller-seatings. This leads to a point contact of the cylindrical rollers of the chain on the camber. Without contact between the chain rollers and the rounded free surfaces of the ring profile, the result is an unstable, oscillating runout of the tensioning and damping element between the inner link plates, visible as flutter between the tight and slack side of the chain.

This decreases the precision of the chain engagement and, with that, decreases in the security of the position and function of the tensioning and damping element in the orbit of the chain drive, with the result that the wear of the latter is increased.

The tooth profile of the known tensioning and damping element has arched, open teeth, which, in conjunction with a closing movement of the respective roller-seating, lead to the clamping contact with the chain roller, before the latter contacts the roller-seating base and, at the same time, forms a gap to the roller-seating base. By means of the mechanism of this closing movement with the formation of the gap to the roller-seating base, only the chain roller, which is in direct engagement and currently the main one in engagement, is contacted completely. In contrast with the chain with a regular, constant pitch, the elastically deformed roller-seatings, upstream and downstream from the contacted roller-seating, with a temporary smaller pitch dimension due to the deformation, are not in a precise engagement position of the chain with the regularly constant pitch of the latter. With that, there is a decrease in the wrapping contact by the chain.

As a result of this difference of setting-in clamping contact of the closing roller-seating with the chain roller, there is, however, during the compression and rebounding of the tensioning and damping element, an imprecise chain engagement between the regular pitch chain and the roller-seatings upstream and downstream from the contacted roller-seating of different deformation and pitch and, with that, differently increased running noise of the chain transmission.

A further changed factor of the form correspondence between the chain and the tooth profile of the tensioning and damping element, drifting from the initial operating state into the final operating state, consists therein that a drifting enlargement of the chain pitch goes along with the elongation of the chain from the running-in time and the wear period and at the operating temperature of the chain drive.

The greater the deformation during the installation in the chain drive, the stronger the roller-seatings are temporarily, disadvantageously made smaller in the engagement segment to the chain, since these lie outside of the neutral bending fiber of the ring part. During this diminution, they assume the profile of a stationary semi-elliptical curve, the main apex axis of which is orthogonal to the pitch circle. At the same time, in the toothed rim of the pre-tensioned tensioning and damping element, lying radially outside of the neutral bending fiber, there are regions with a compressed pitch in the area, in which there is contact with the chain.

With regard to the corresponding shape of the toothed rim and the chain, there accordingly are deviations in the precision in the case of an elliptical pre-tensioned, a partly pre-tensioned and a not pre-tensioned concentric tensioning and damping element as well as in the case of a not extended chain, a partly extended chain and a chain extended to the limit. Increasing and decreasing moments as well as the change between the tight side and the slack side of the chain during the reversing, produce changing contact angles as well as transitional deformations of the toothed rim and of the chain engagement and, with that, further precision deficiencies.

To summarize, during the operating period of the chain transmission, there are nonstationary engagement relationships between the toothed rim and the chain with regard to an imprecise chain engagement, which results from a large number of factors.

Due to the toothed rim, considered stationary according to the usual construction principles for chain sprockets, and configured concentrically, the latter, under operating conditions with the elliptical deformation of the tensioning and damping element, has unequal roller-seatings.

If these are suitable for the acting chain contact, they are compressed and made smaller for the commencing contact and stretched and enlarged for the loosening contact. These deviations, which, however, occur as errors only under operating conditions, increase with increasing chain speed and increasing compression.

All told, the known tensioning and damping elements, in conjunction with the wear of the chain, the load changing phases as well as the reversing according to the degree of deformation, have the disadvantage of a phased running irregularity, an increased running noise caused by engagement surges and of wear-intensive areas at the flanks of the teeth.

During their elliptical pre-tensioned state, the technical cause of these disadvantages of the known tensioning and damping elements consist of the unstable point contact of the chain rollers with the deformation-produced cambers of the ring-part profile in the vicinity of the root circle of the roller-seatings, in the differences of pitch and of shape correspondence with the chain as contact commences, in the acting contact and in the detaching contact of the dimension-determining chain contact of the engaging roller-seating with the upstream and downstream chain rollers, in the difference between the regular pitch of the toothed rim in the manufactured, concentric condition and the deformation caused reduced pitch, in the roller-seating closing in the elliptical pre-tensioned state as well as in the indifferent variance of the pitch of the toothed rim in the case of the different deformations in the operating period from the wear-dependent drifting enlargement of the pitch of the chain until the latter is worn out. For the tensioning and damping elements of the type described, the pitch of the toothed rim varies, depending on the function according to the degree of the elastic deformation of the elliptical shape.

Moreover, for the construction of concentric chain sprockets, the DE 102 37 277 A1 as well as the DE 200 06 278 U1 are known, for which the distance between pitches of the drive wheel or the chain sprocket, for the purpose of equalizing expansions, which depend on load and heat, as well as wear of the transmission or the chain, is greater than the distance between pitches of the counter-engagement element of the transmission or of the chain.

This constant enlargement of the pitch on the concentric pitch circle is related to the fixed chain sprockets and the wear up to the wear limit of the drive.

The elastic compression and expansion of the ring part, the deformation of the roller-seating, the deformation of the elastic toothed rim and the therewith associated omission of the pitch circle for the elastically deformed tensioning and damping element are not taken into consideration in an incomplete manner. The technical reason for this is the non-recognition of a Cassinian, elliptic curve of the pitch as a temporary restriction, which is additionally present in the case of an elastically deformed tensioning and damping element as an operating condition.

SUMMARY OF THE INVENTION

The objective of the invention is a tensioning and damping element for endless chain drives, especially for roller chain drives, with improved running behavior, less running noise and less wear, which can be used for longer tensioning paths and higher chain speeds.

It is therefore an object of the invention to develop the tensioning and damping element in a further embodiment that, during its deformation between the stress-free concentric state and the elliptical pre-tensioned installed state, a toothed rim with roller-seatings, having a more stable run out, it has a decreased transfer of heat from the chain to the ring part, an elliptical shape, fitting the chain which is subject to wear and, between its concentric and elliptical shape, a tooth profile pitch fitting the chain pitch, as well as more stable engagement in the contact arc to the chain.

In accordance with the invention, the objective is accomplished by the features of the above noted embodiments.

Further developments of the invention are the subject matter of the further embodiments.

The invention is based on the recognition that the contact arcs about the tensioning and damping element, during the engagement of the tight side and the slack side of the chain regularly are limited to fewer than 5 chain links, the dimension-determining chain contact comprising the secondary vortexes of the elliptical shape. Regularly, 2 chain links, commencing the engagement of the roller-seatings of the tensioning and damping element, are upstream from and regularly 2 chain links, detaching from the roller-seatings, are downstream from the dimension-determining chain contact.

This segmental engagement of the tooth profile of the tensioning and damping element means radially curved segments, corresponding to the manufacturing status and to the phase of the end of the operating time with the worn chain, in distinction from the elliptically curved segments corresponding to the deformation at the start of the operating time with a new chain.

The solution concept is based on configuring the contradiction between the concentric shape of the tensioning and damping element, which is imposed by manufacturing considerations, and its deformation variation during the operating period, which is imposed by functional considerations, in such a way that the correspondence of the pitch and of the roller-seatings of its toothed rim to the dimension-determining chain contact of the chain roller, which is engaging, and the contacting chain rollers which are commencing to contact and are becoming detached, is solved by a contact tolerance, which fits the extreme values for the minimum and maximum deformation better.

In accordance with the invention, the roller-seatings have bulges, which are disposed on opposite sides in the width, are free-standing towards the ring part and prehensile in the inner width of the chain. Between these bulges, there is a roller-seating depression which functions as open space towards the chain roller. The bulges are protruding, stabilizing positioning surfaces for the position and rolling motion of the approaching rollers.

The tensioning and damping element rotates in the orbit of the chain drive, so that, as a result of the stable positioning surfaces, there are no run out fluctuations and there is no flutter between the tight side and the slack side of the chain.

The bulges extend from the root circle up into the flanks of the teeth. With that, the plane stable rolling of the dimension-determining contacted chain rollers and the chain rollers, which are upstream and downstream in the chain, is made possible on both sides of the inner plates of the chain up to a contact of at least 5 chain links.

The bulges are disposed on the planar side of the roller-seatings and, towards the outside, form open grooves to the ring part. With that, the undesirable transfer of heat from the chain contact into the ring part is inhibited.

In the case of elliptical deformation of the tensioning and damping element in the chain engagement region, there is pressure deformation of the roller-seating. At the same time, the roller-seating in the root circle is compressed so that a camber is formed and the roller-seating depression is made smaller.

On the condition that the camber is not larger than the bulge, there are stable roller supports on the bulges on either side of the roller-seating. Owing to the fact that the bulges extend up into the flanks of the teeth, the chain engagement, from the initial to the loosening contact, is assured with stable support in the roller-seating for all deformation conditions between the end positions.

The disadvantageous pressure deformation and, with that, the compression of the toothed rim in the contact region with the chain is avoided, in that the pitch $q_0$ of the latter in the construction is enlarged to such an extent, that it is larger than the pitch $p_0$ of the not extended chain in every phase of the elastic deformation.

Accordingly, taking into consideration the operating period of the new, operationally heated, drifting chain, which is either subject to wear or is worn out, an extension factor of $1.02 \times p_0 < q_0 < 1.08 \times p_0$ was determined as basically suitable for the pitch $q_0$.

With that, the value $q_0$ is the value for the pitch of the tensioning and damping element as a concentric finished part. Advantageously, this factor was determined with $q_0 = 1.05 \times p_0$.

With this extension of the pitch, there is an improved correspondence of the pitch of the roller-seatings of the toothed rim between the dimension-determining chain contact of the engaging chain roller and the incipiently contacting and contact loosening chain rollers over the whole operating period.

In deviation from the usual development of the tooth profile for chain sprockets with radial Roller-seatings, a tooth profile with radially extending roller-seatings, preferably with a semielliptical profile shape, is proposed in accordance with the invention. The roller-seatings, with the depressions of the roller-seating hollows, rest on the root circle of the tensioning and damping element and extend up into the heads of the teeth.

Based on the tensioning and damping element as a concentric finished part and the roller diameter $d_1$, an extension factor of $1.1 \times d_1 < l_0 < 1.45 \times d_1$ was determined as suitable for the length $l_0$ of the main apical axis of the profile shapes between the points $W_1$ and $W_2$.

Pressure deformations of the tooth profile come into being in the engagement region of the chain and in the case of a pre-tensioned tensioning and damping element. For this pressure deformation of the roller-seatings lying outside of the neutral bending fiber, the dimension $l_0$ is adjusted elastically to the dimension $l_1$, the disadvantageous elliptical roller-seating shape at the chain roller and the elliptical roller-seating shape "standing" on the root circle being prevented by the factors named above.

Due to the roller-seatings, extended in accordance with the invention, and with the profile shape similar to a semielliptical curve resting on the root circle, there is a greater shape tolerance and an improved shape correspondence between the dimension-determining engaging chain roller and the chain rollers, which either are commencing to contact or are becoming detached over the whole of the operating period. Due to the shape of the semielliptical curve, a symmetrical tooth profile, which is independent of the running direction of the chain, is created at the same time.

With that and independently of the deformation of the tensioning and damping element and the condition of wear of the latter, the chain contacts the roller-seatings with its rollers constantly with tooth gap clearance.

Therewith and in combination with the individually proposed features, the tensioning and damping element is self-adjusting between the concentric shape, which is imposed by manufacturing considerations and its deformation variations, which are imposed by functional considerations, over its own operating period and over the operating period of the chain up to the condition, in which it is worn out to the limit.

The advantages, mainly achieved therewith, comprise better running precision of the whole chain drive, less running noise, slower wear of the tooth profile and better load carrying capability with regard to the deformation starting out from the concentric condition and the therefrom resulting spring deflection.

The invention is to be described in greater detail below by means of an example.

DETAILED DESCRIPTION OF ILLUSTRATIVE EMBODIMENTS

Figure 1:
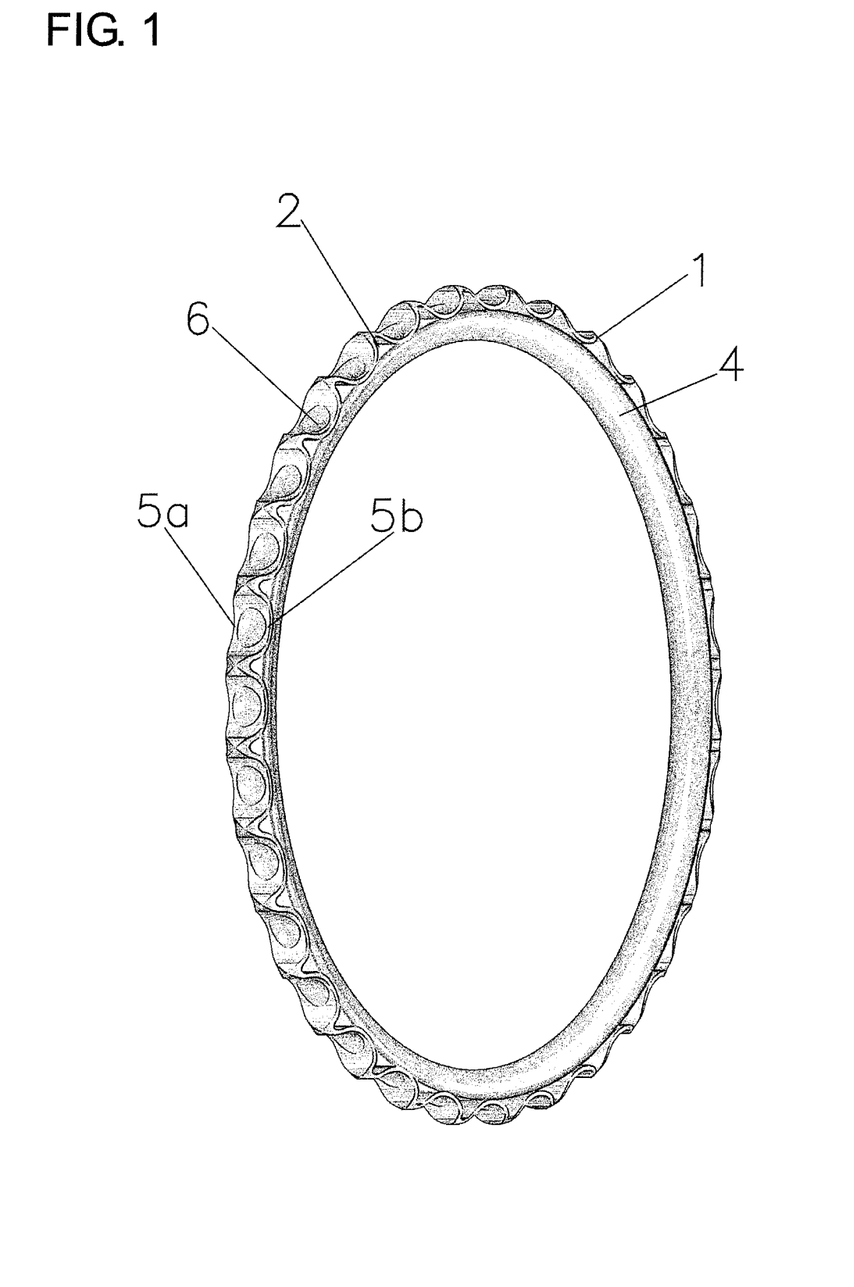
FIG. 1 shows the image of a tensioning and damping element as a finished product.

The tensioning and damping element, shown in FIG. 1, is concentric. In this not pretensioned configuration, it corresponds to the configuration of the finished product.

Figure 2:
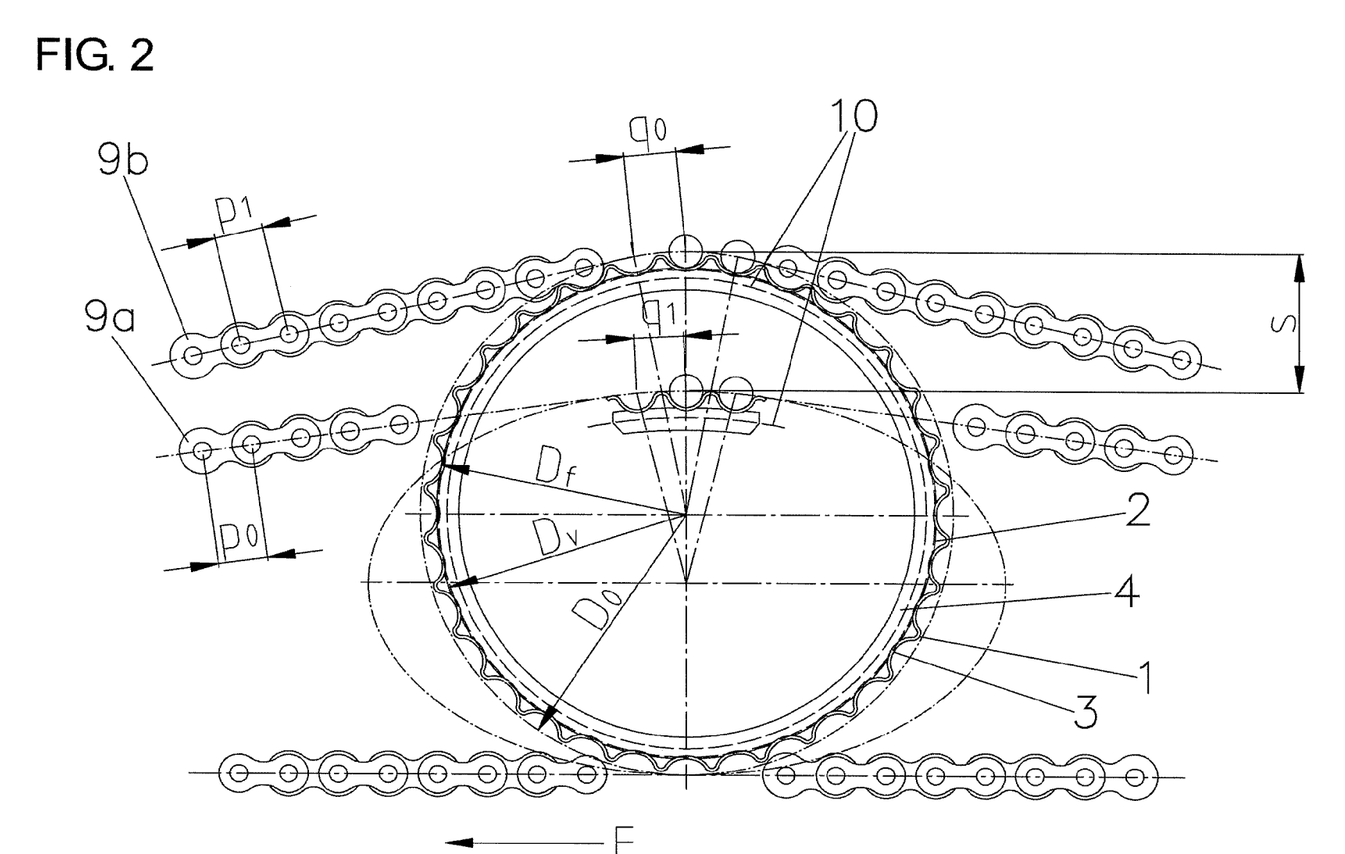
FIG. 2 shows the engagement picture of the tensioning and damping element for the respective end positions of the stress-free concentric shape and the pre-stressed elliptical shape
Figure 5:
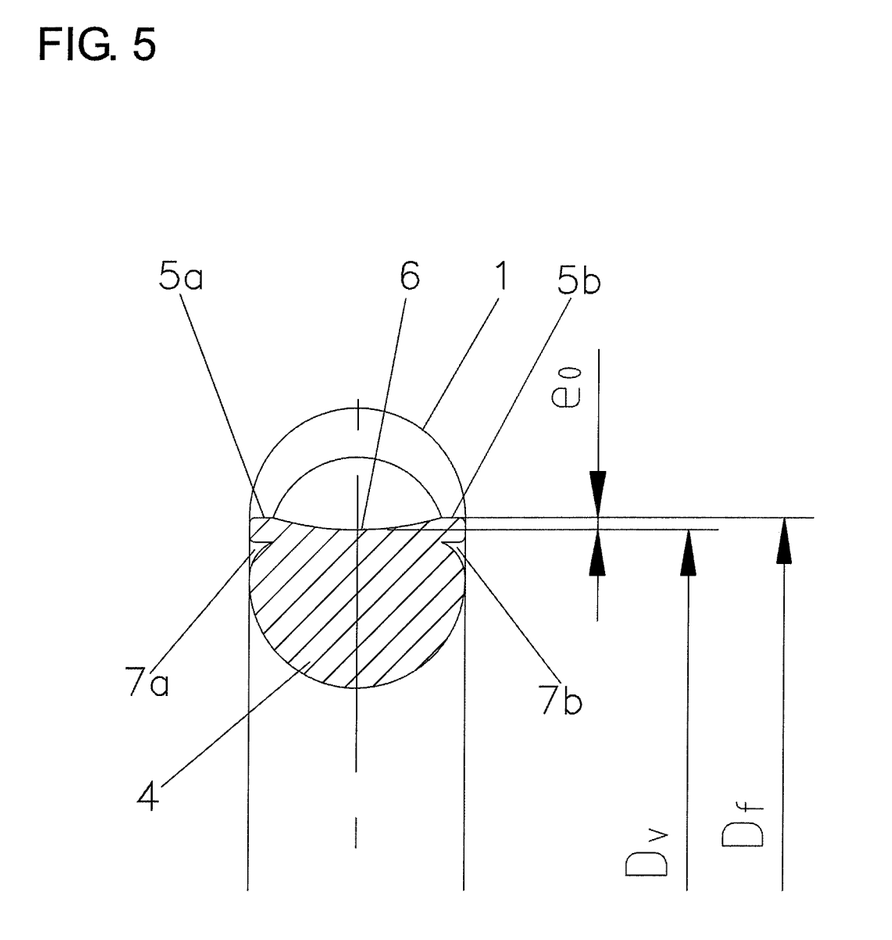
FIG. 5 shows a sectional representation through a roller-seating in the stress-free state.
Figure 7:
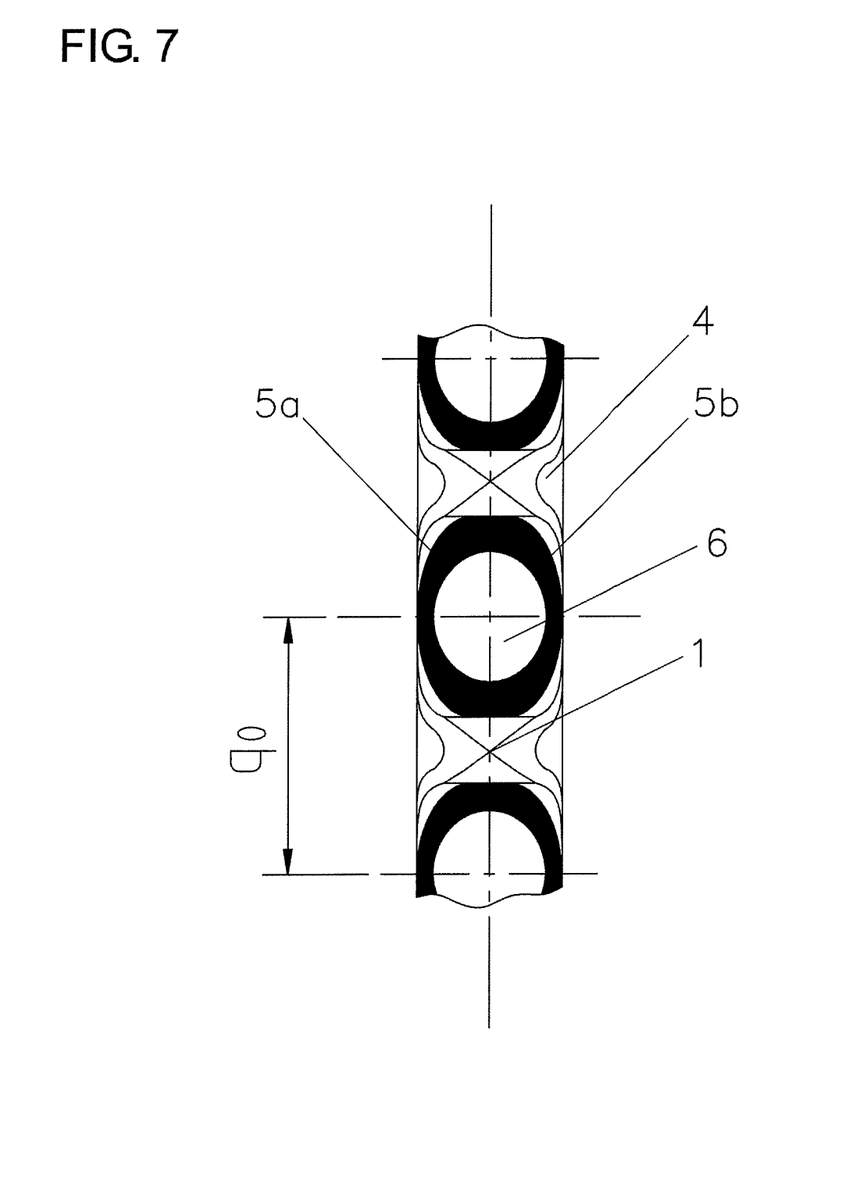
FIG. 7 shows the projection of the contact zones of the roller-seatings of the concentric tensioning and damping element to the chain rollers.

As is evident from FIGS. 1 and 2, as well as FIGS. 5 and 7, the tensioning and damping element has, on the inside of the root circle, a ring part 4, which is partly exposed under the teeth 1 of the toothed rim and blends over its circumferential surface 2 with the roller-seatings 3 of the toothed rim in the root circle $D_f$.

The roller-seatings of the tooth profile have bulges 5a, 5b, which, in profile, are disposed opposite to one another and extend into the tooth flanks and into the root circle $D_f$. Centrally between the bulges and extending in the ring part up to the depression circle $D_v$, there are roller-seating depressions 6 with a depth of $e_0=0.5(D_f-D_v)$.

The bulges are free-standing on the planar side and on the outside and form grooves 7a, 7b to the ring part.

As shown in FIG. 7, the contact regions between the roller-seatings and the rollers of the chain are resting on the bulges. The roller-seating depressions are exposed to the roller-seatings.

Any undesirable transfer of heat from the bulges into the ring part is interrupted by the grooves.

Figure 6:
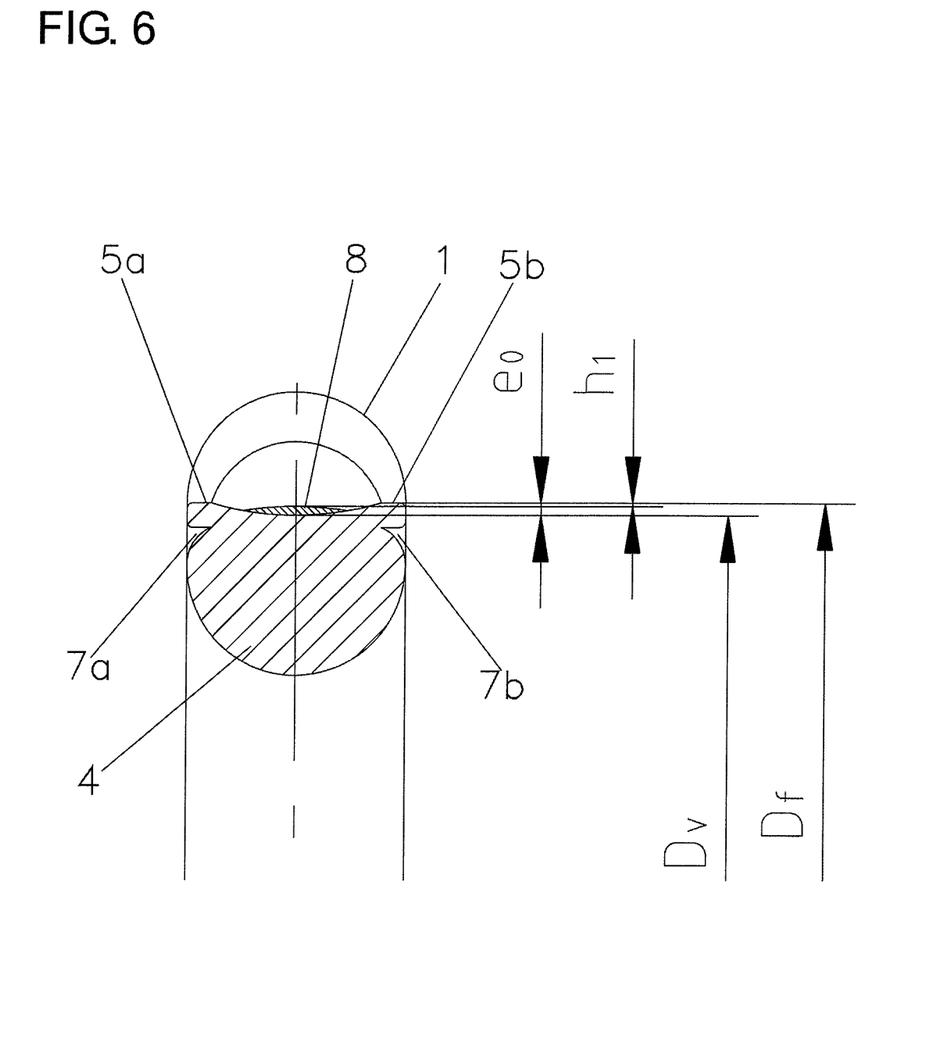
FIG. 6 shows a sectional representation through a roller-seating in the case of an elliptical deformation.

If, as shown in FIG. 2, elliptical deformation of the tensioning and damping element leads to pressure deformation of the roller-seating, the latter, as shown in FIG. 6, is compressed in the region of the root circle in such a manner, that a camber 8, with a height h1 is formed and the roller-seating depression becomes smaller. On the condition that the height of the camber $h_1<e_0$, there are stable roller supports on either side on the bulges of the roller seating. Owing to the fact that the bulges extend up into the flanks of the teeth, the chain engagement, from the initial up to the loosening contact, is assured with stable support in the roller seating for all deformation conditions between the end positions.

As is furthermore evident from FIG. 2, there is, for the end positions of the stress-free concentric shape and the pre-stressed elliptical shape, no agreement between the pitch $q_0$ of the concentric shape corresponding at the same time to the finished part and the pitch $q_1$ of the toothed rim corresponding to the pre-tensioned elliptical shape. Moreover, $q_0>q_1$.

Likewise, there is no agreement between the pitches $p_a$ and $p_1$ of the chain.

The pitch of the tensioning and damping element, which determines the dimensions and manufacture, is the pitch $p_a$ of the chain 9a, which is not worn out at the beginning of the operating time. On the other hand, the pitch $p_1$ is that of the worn-out chain 9b with $p_1>p_0$.

For a precise engagement of the chain, the pitch $q_1$ of the tensioning and damping element is specified by $q_1 \geq p_0$, the closing movement of the toothed rim and the condition that there should be no jamming of the chain rollers having been taken into consideration. As the chain becomes worn out, the original pitch of the chain increases until the elongation due to wear reaches the dimension $p_1$ and the degree of deformation of the tensioning and damping element reaches the concentric shape with the pitch $q_0$.

At the end of the operating period, the chain, shown by way of example, has an elongation due to wear of 3%, so that a pitch of $p_1=1.03 \times p_0$ results. For this elongation of the worn-out chain 9b, the tensioning and damping element is concentric and no longer pretensioned at the end of its tensioning path.

Owing to the fact that the toothed rim lies outside of the neutral bending line 10 of the ring part, the pitch of the concentric shape $q_0$ is larger than the pitch of the elliptical shape $q_1$ with regard to the engagement region of the tensioning and damping element to the chain.

The disadvantageous compression of the toothed rim in the contact region to the chain accordingly is prevented in that the pitch $q_0$ of the toothed rim is enlarged to such an extent that, in each phase of the deformation, it is larger than the amount of the chain pitch with the pitch $p_1$.

For this extended pitch $q_0$, $q_0=1.05p_0$ was determined to be particularly suitable.

With this extension of the pitch, there is an improved correspondence of the pitch of the roller-seatings of the toothed rim between the dimension-determining chain contact of the engaging chain roller and the incipient contacting and contact loosening chain rollers over the whole operating period.

Figure 3:
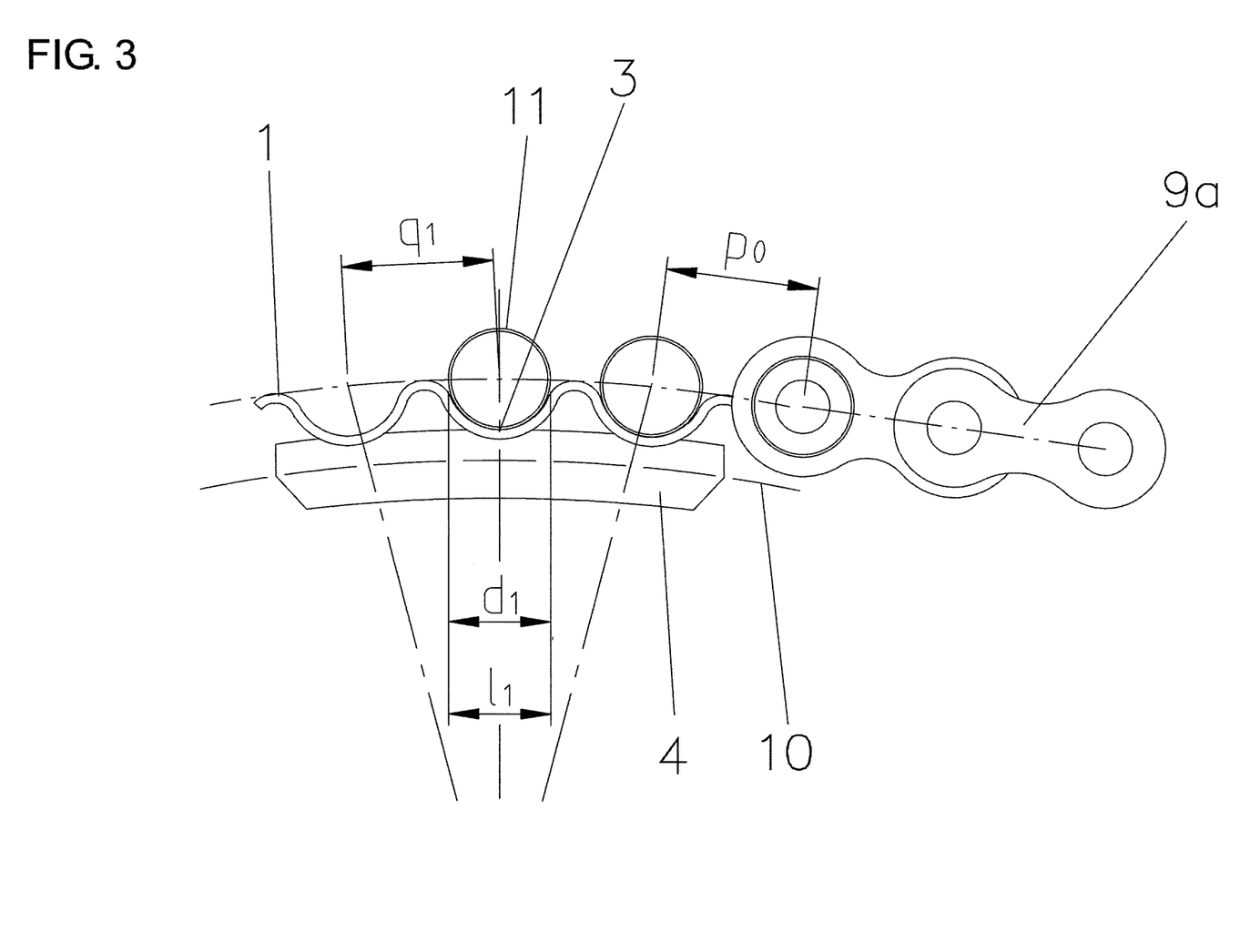
FIG. 3 shows a cutout from the engagement picture of the tensioning and damping element for the end position of the elliptical shape with a chain, which is not worn out.

As it is evident from FIG. 3, the toothed rim of the tensioning and damping element, at the beginning of the operating period with a chain that is not worn, engages the chain in the end position of the elliptical shape in the smaller curvature characteristic of the secondary crown area. Moreover, the tooth profile is compressed and forms an adjacent roller-seating 3 to the engaging roller 11. The distance to the respective upstream and downstream roller seating is $q_1$. For the explanation, given by way of example, $p_0=q_1$ was selected. The rollers of the chain links of the new chain, upstream and downstream from the dimension determining engagement, accordingly intervene in the pitch agreement.

Figure 4:
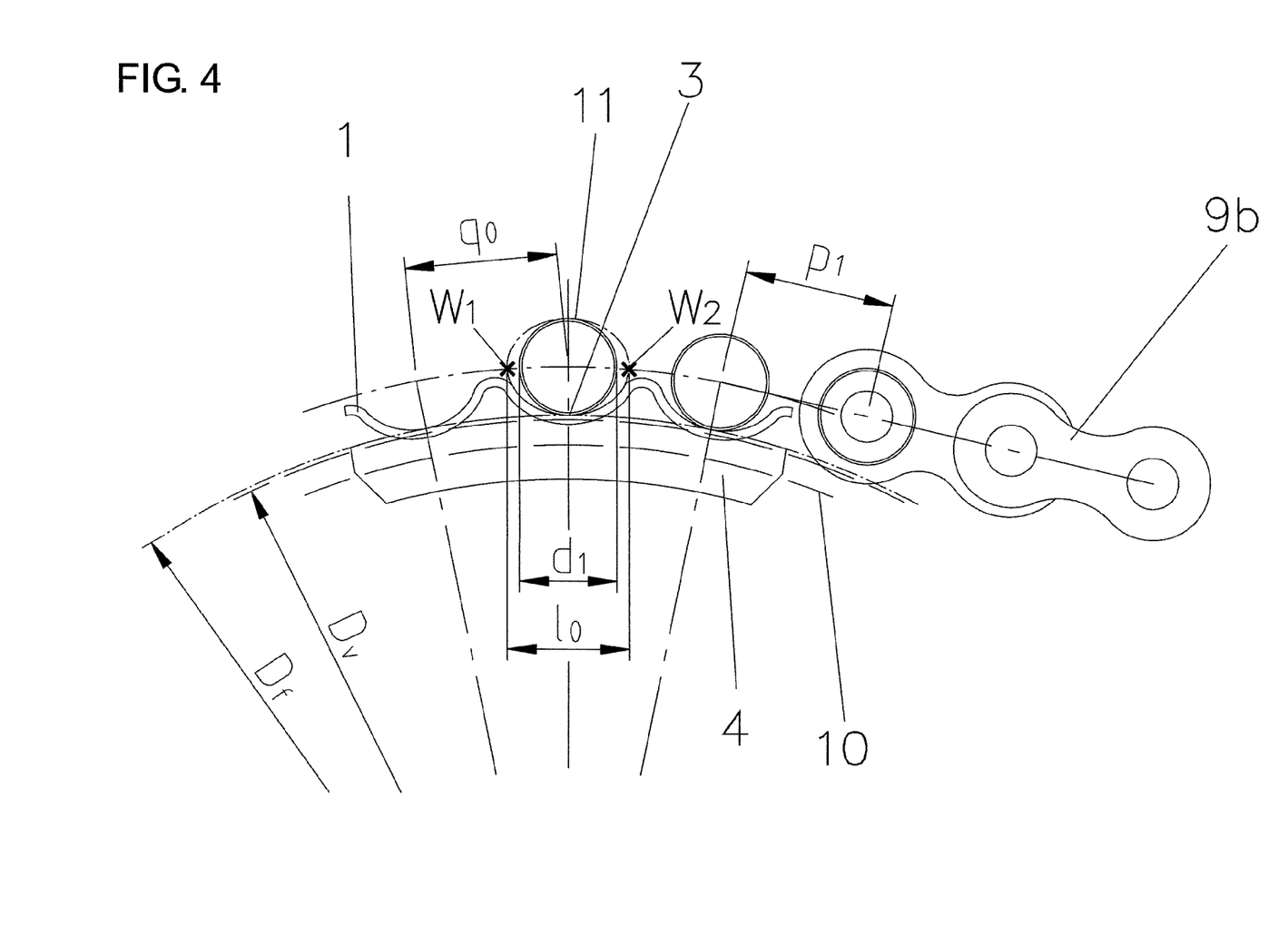
FIG. 4 shows a cutout from the engagement picture of the tensioning and damping element for the end position of the concentric shape when the chain is elongated due to wear.

As is evident from FIG. 4, when the chain is elongated due to wear and at the end of the tensioning path s, the toothed rim of the tensioning and damping element engages the end position of the concentric shape in the radial curvature characteristic of the circular segment. At the same time, the radial curvature corresponds to the curvature of the finished part. In accordance with the manufacture, the toothed rim has a pitch $q_0$ and an extended pitch circle, corresponding to the number of teeth.

In deviation from the usual tooth profile for chain sprockets with radial roller-seatings, the tooth profile has regularly extended roller-seatings 3. The roller-seatings, resting on the root circle, have a profile shape similar to a semi-elliptical curve. The main apex axis between the points $W_1$ and $W_2$ and projected on the pitch circle $D_o$, has a length of $l_0$. The depth of the roller-seatings arises from the elliptical ratio. The heights of the teeth lie within the tip circle. With the depressions of the roller-seating hollows, the roller seatings rest tangentially on the root circle of the tensioning and damping element and extend up into the tooth flanks.

For the length $l_0$ of the main apex axis of the profile shape between the points $W_1$ and $W_2$, a factor of $l_0=1.25\times d_1$ was used, by way of example, with regard to the roller diameter $d_1$ of the chain.

With that, the tensioning and damping element with the extended roller-seatings, independently of its deformation and of the state of wear of the chain, contacts the rollers of the chain, which they are constantly capable of gripping, between the dimension determining engaging chain roller and the incipiently contacting and contact loosening chain rollers with an increased pitch and shape tolerance over the whole operating period with the result of improved running, less running noise and less wear. Moreover, it can be used in an area with longer tensioning paths and higher chain speeds.

The invention claimed is:

1. A tensioning and damping element, wherein
   the tensioning and damping element is disposable between a tight side and a slack side of an endless chain drive and thereby acting constantly on both sides of the endless chain drive,
   the tensioning and damping element being formed as an elastically deformable element which includes elastic plastic, and comprising:
   a ring part,
   at the outer periphery of the ring part, a corresponding toothed rim, capable of gripping the endless chain drive,
   elastically deformable, laterally open teeth and,
   in a root circle of the toothed rim, radially elastic roller-seatings between the teeth, which pass into the ring part,
   and wherein the tensioning and damping element is deformable between a shape of a concentric element and a shape of a Cassinian curve with a shape close to an ellipse, the diameter of a pitch circle or a smallest axis of the tensioning and damping element being larger than a diameter of a pitch circle of a smallest chain sprocket of the endless chain drive,
   wherein the radially elastic roller-seatings have bulges, which are axially on opposite sides in the width of the radially elastic roller-seatings, arranged on either side of the ring part and lying externally on a root circle with a roller-seating depression of a depth $e_0=0.5(D_f-D_v)$, $D_f$ being the diameter of the root circle and $D_v$ being the diameter of a depression circle, the roller-seating depression extends centrally between the bulges in the ring part between the root circle and the depression circle, the amount $e_0$ of which, in a stress-free starting position, is larger than the amount of a height $h_1$ in a camber in an elliptical, pretensioned state,
   wherein the toothed rim has grooves between the ring part and the bulges, and wherein the toothed rim has an extended pitch $q_0$ with $1.02\times p_0<q_0<1.08\times p_0$, $p_0$ being a pitch of the endless roller chain, which is not worn out,
   wherein the radially elastic roller-seatings are extended with a profile shape similar to a semi-elliptical curve, which lies radially on the root circle and which has a main apex axis between two points which, projected on the pitch circle, has a length $l_0$, which is given by $1.1\times d_1<l_0<1.45\times d_1$, wherein $d_1$ is a diameter of a roller of the endless roller chain.

2. The tensioning and damping element of claim 1, wherein the extended pitch is $q_0=1.05\times p_0$.

3. The tensioning and damping element of claim 1, wherein the length is $l_0=1.25\times d_1$.

* * * * *